(12) United States Patent
Fusco et al.

(10) Patent No.: US 12,210,827 B2
(45) Date of Patent: Jan. 28, 2025

(54) SPECIFICITY RANKING OF TEXT ELEMENTS AND APPLICATIONS THEREOF

(71) Applicant: International Business Machines Corporation, Armonk, NY (US)

(72) Inventors: Francesco Fusco, Zurich (CH); Cesar Berrospi Ramis, Zurich (CH); Peter Willem Jan Staar, Zurich (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 459 days.

(21) Appl. No.: 17/408,764

(22) Filed: Aug. 23, 2021

(65) Prior Publication Data

US 2023/0055769 A1 Feb. 23, 2023

(51) Int. Cl.
*G06F 40/284* (2020.01)
*G06F 18/2113* (2023.01)
*G06N 5/02* (2023.01)
*G06V 30/262* (2022.01)

(52) U.S. Cl.
CPC ........ *G06F 40/284* (2020.01); *G06F 18/2113* (2023.01); *G06N 5/02* (2013.01); *G06V 30/262* (2022.01)

(58) Field of Classification Search
CPC .... G06F 40/284; G06F 18/2113; G06F 40/30; G06N 5/02; G06N 5/022; G06V 30/262
USPC .......................................................... 704/9
See application file for complete search history.

(56) References Cited

U.S. PATENT DOCUMENTS

| | | |
|---|---|---|
| 8,370,319 B1 | 2/2013 | Krynski |
| 11,361,571 B1 * | 6/2022 | Fusco ..................... G06F 40/30 |
| 2005/0198026 A1 * | 9/2005 | Dehlinger ............... G06F 40/56 |
| | | 707/999.005 |

(Continued)

OTHER PUBLICATIONS

"Deep Search: Connecting unstructured data", Certain functionality of the disclosure was stored on IBM servers Internal to assignee, and this functionality was made available for sale as a service via IBM Research Deep Search platform on Mar. 2021. <https://www.research.IBM.com/science/deep-search/>, 19 pages.

(Continued)

*Primary Examiner* — Pierre Louis Desir
*Assistant Examiner* — Fouzia Hye Solaiman
(74) *Attorney, Agent, or Firm* — Tutunjian & Bitetto, P.C.; Daniel Morris

(57) ABSTRACT

Ranking a plurality of text elements, each comprising at least one word, by specificity. For each text element to be ranked, such a method includes computing an embedding vector that locates a text element in an embedding space, and selecting a set of text fragments from reference text. Each of these text fragments contains the text element to be ranked and further text elements. For each text fragment, the method calculates respective distances in the embedding space between the further text elements. The method further includes calculating a specificity score for the text element to be ranked and storing the specificity score. After ranking the plurality of text elements, a text data structure using the specificity scores for text elements to extract data having a desired specificity from the data structure may be processed.

20 Claims, 14 Drawing Sheets

900a

| Top 10 MWE for knowledge tokens | Specificity Score |
|---|---|
| semantic_knowledge | 0.30501753 |
| knowledge_bases | 0.29965025 |
| zero_knowledge_proof | 0.28638414 |
| knowledge_graph | 0.278743 |
| knowledge_workers | 0.27523914 |
| knowledge_representation | 0.2632137 |
| knowledge_management_system | 0.25980532 |
| knowledge_extraction | 0.24009512 |
| knowledge_models | 0.23223779 |
| expert_knowledge | 0.22648883 |

| Bottom 10 MWE for knowledge tokens | Specificity Score |
|---|---|
| knowledge_based | 0.13608991 |
| domain_knowledge | 0.123538986 |
| knowledge_databases | 0.120853886 |
| personal_knowledge | 0.0907157 |
| shared_knowledge | 0.09602575 |
| acquiring_knowledge | 0.07280773 |
| gain_knowledge | 0.0530308 |
| local_knowledge | 0.04199545 |
| knowledge_access | 0.025819127 |
| knowledge_value | 0.020750735 |

(56) References Cited

U.S. PATENT DOCUMENTS

| | | | |
|---|---|---|---|
| 2005/0220351 A1* | 10/2005 | Vanderwende | G06F 16/367 382/229 |
| 2016/0078102 A1* | 3/2016 | Crouch | G06F 16/313 707/722 |
| 2017/0199875 A1* | 7/2017 | Nevrekar | G06F 16/24553 |
| 2019/0034415 A1 | 1/2019 | Walsh | |
| 2019/0057310 A1* | 2/2019 | Olmstead | G06F 40/30 |
| 2021/0096716 A1* | 4/2021 | Tran | G06F 3/0487 |
| 2022/0075833 A1* | 3/2022 | Marikar | G06F 16/953 |
| 2022/0171931 A1* | 6/2022 | Fusco | G06N 20/00 |
| 2022/0261428 A1* | 8/2022 | Osuala | G06N 3/045 |
| 2023/0154593 A1* | 5/2023 | Gao | G16H 30/20 382/181 |

OTHER PUBLICATIONS

"Multiword Expressions", ACL Wiki, <https://aclweb.org/aclwiki/Multiword_Expressions>, last edited on Jun. 25, 2012, 4 pages.

Arabzadeh et al., "Neural Embedding-Based Metrics for Pre-retrieval Query Performance Prediction", © Springer Nature Switzerland AG 2020, J. M. Jose et al. (Eds.): ECIR 2020, LNCS 12036, 8 pages.

Arampatzis et al., "An Empirical Study of Query Specificity", C. Gurrin et al. (Eds.): ECIR 2010, LNCS 5993, 2010, © Springer-Verlag Berlin Heidelberg 2010, 4 pages.

Bonin et al., "A Contrastive Approach to Multi-word Extraction from Domain-specific Corpora", Proceedings of the Seventh International Conference on Language Resources and Evaluation (LREC'10), May 2010, 8 pages.

Choudary et al., "Gain insights into an ocean of documents with deep search", Servers & Storage, <https://www.ibm.com/blogs/systems/gain-insights-into-an-ocean-of-documents-with-deep-search/>, Nov. 19, 2020, 4 pages.

Cordeiro et al., "mwetoolkit+sem: Integrating Word Embeddings in the mwetoolkit for Semantic MWE Processing", printed on Apr. 15, 2021, 5 pages.

Mahata et al., "Key2Vec: Automatic Ranked Keyphrase Extraction from Scientific Articles using Phrase Embeddings", Proceedings of NAACL-HLT 2018, New Orleans, Louisiana, Jun. 1-6, 2018, © 2018 Association for Computational Linguistics, 6 pages.

Mikolov et al., "Distributed Representations of Words and Phrases and their Compositionality", NIPS, 2013, 9 pages.

Riedl et al., "A Single Word is not Enough: Ranking Multiword Expressions Using Distributional Semantics", Proceedings of the 2015 Conference on Empirical Methods in Natural Language Processing, Lisbon, Portugal, Sep. 17-21, 2015, © 2015 Association for Computational Linguistics, 11 pages.

Ryu et al., "Measuring the Specificity of Terms for Automatic Hierarchy Construction", MeSH 2003, 6 pages.

Ryu et al., "Taxonomy Learning using Term Specificity and Similarity", Proceedings of the 2nd Workshop on Ontology Learning and Population, Sydney, Jul. 2006, © 2006 Association for Computational Linguistics, 8 pages.

Tutubalina et al., "Clustering-based Approach to Multiword Expression Extraction and Ranking", Proceedings of NAACL-HLT 2015, Denver, Colorado, May 31-Jun. 5, 2015, © 2015 Association for Computational Linguistics, 5 pages.

* cited by examiner

900a

| Top 10 MWE for knowledge tokens | Specificity Score |
|---|---|
| semantic_knowledge | 0.30501753 |
| knowledge_bases | 0.29965025 |
| zero_knowledge_proof | 0.28638414 |
| knowledge_graph | 0.2787431 |
| knowledge_workers | 0.27523914 |
| knowledge_representation | 0.2632137 |
| knowledge_management_system | 0.25980532 |
| knowledge_extraction | 0.24099512 |
| knowledge_models | 0.23223779 |
| expert_knowledge | 0.22648883 |
| Bottom 10 MWE for knowledge tokens | Specificity Score |
| knowledge_based | 0.12600991 |
| domain_knowledge | 0.123538986 |
| knowledge_databases | 0.120853886 |
| personal_knowledge | 0.0967157 |
| shared_knowledge | 0.09602575 |
| acquiring_knowledge | 0.07209773 |
| gain_knowledge | 0.05203083 |
| local_knowledge | 0.04199545 |
| knowledge_access | 0.025819127 |
| knowledge_value | 0.020750735 |

| Top 10 MWE for language tokens | Specificity Score |
|---|---|
| compiled_language | 0.46839932 |
| source_language | 0.44837314 |
| hardware_description_language | 0.42614472 |
| query_language | 0.4211843 |
| dynamic_language | 0.41563812 |
| language_modeling | 0.4119998 |
| language_code | 0.4024002 |
| target_language | 0.39835948 |
| implementation_language | 0.3876245 |
| language_model | 0.38689494 |

| Bottom 10 MWE for language tokens | Specificity Score |
|---|---|
| classical_language | 0.06960836 |
| unifying_language | 0.064740695 |
| main_language | 0.06395983 |
| graphical_language | 0.061067622 |
| language_complexity | 0.039959792 |
| traditional_language | 0.039436366 |
| real_language | 0.013062653 |
| explicit_language | -0.0148494365 |
| picture_language | -0.014961158 |
| alternative_language | -0.026009649 |

FIG. 9B

SPECIFICITY RANKING OF TEXT ELEMENTS AND APPLICATIONS THEREOF

STATEMENT REGARDING PRIOR DISCLOSURES BY THE INVENTOR OR A JOINT INVENTOR

The following disclosure is submitted under 35 U.S.C. § 102(b)(1)(A): certain functionality of this disclosure as designed by Francesco Fusco and Peter Willem Jan Staar was stored on servers internal to the assignee of this patent application, where this functionality was made available for sale as a service via the IBM Research Deep Search platform on March 2021.

BACKGROUND

The present invention relates generally to specificity ranking of text elements. Computer-implemented methods are provided for ranking a plurality of text elements by specificity, together with applications of such methods. Systems and computer program products implementing these methods are also provided.

The specificity of text elements, such as words or phrases, is a measure of the quantity of information contained in those elements. When a text element contains a lot of information in a given domain, that element is highly specific to the domain, and vice versa. The specificity of text has been estimated in the context of search systems to assess whether to return general or specific search results for a search query, or to suggest alternate search queries to a user. Most prior techniques for estimating specificity use statistics based on analyzing parts of speech (e.g. how often nouns are modified) or the frequency of occurrence of particular terms. One technique evaluates specificity of terms using various metrics derived from vectors which locate those terms in an embedding space generated via a word embedding scheme. This technique employs metrics obtained by analyzing the distribution of embedding vectors in the pretrained embedding. Once the embedding matrix is trained, vector distribution in the embedding space is the only factor used to assess specificity.

SUMMARY

One aspect of the present invention provides a computer-implemented method for ranking a plurality of text elements, each comprising at least one word, by specificity. For each text element to be ranked, the method includes computing, via a word embedding scheme, an embedding vector which locates that text element in an embedding space, and selecting a set of text fragments from reference text. Each of these text fragments contains the text element to be ranked and further text elements. For each text fragment, the method calculates respective distances in the embedding space between the further text elements, each located in said space by an embedding vector computed via the word embedding scheme, and the text element to be ranked. The method further comprises calculating a specificity score, dependent on the aforementioned distances, for the text element to be ranked, and storing the specificity score. The resulting specificity scores for the plurality of text elements define a ranking of the text elements by specificity.

Respective further embodiments of the present invention provide a computing system which is adapted to implement a method for ranking text elements as described above, and a computer program product including a computer readable storage medium embodying program instructions, executable by a computing system, to cause the computing system to implement such a method.

BRIEF DESCRIPTION OF THE DRAWINGS

Embodiments of the present invention will be described in more detail below, by way of illustrative and non-limiting example, with reference to the accompanying drawings.

FIGS. 9A and 9B illustrate specificity rankings obtained in an implementation of the system shown in FIG. 4.

DETAILED DESCRIPTION

Figure 1:
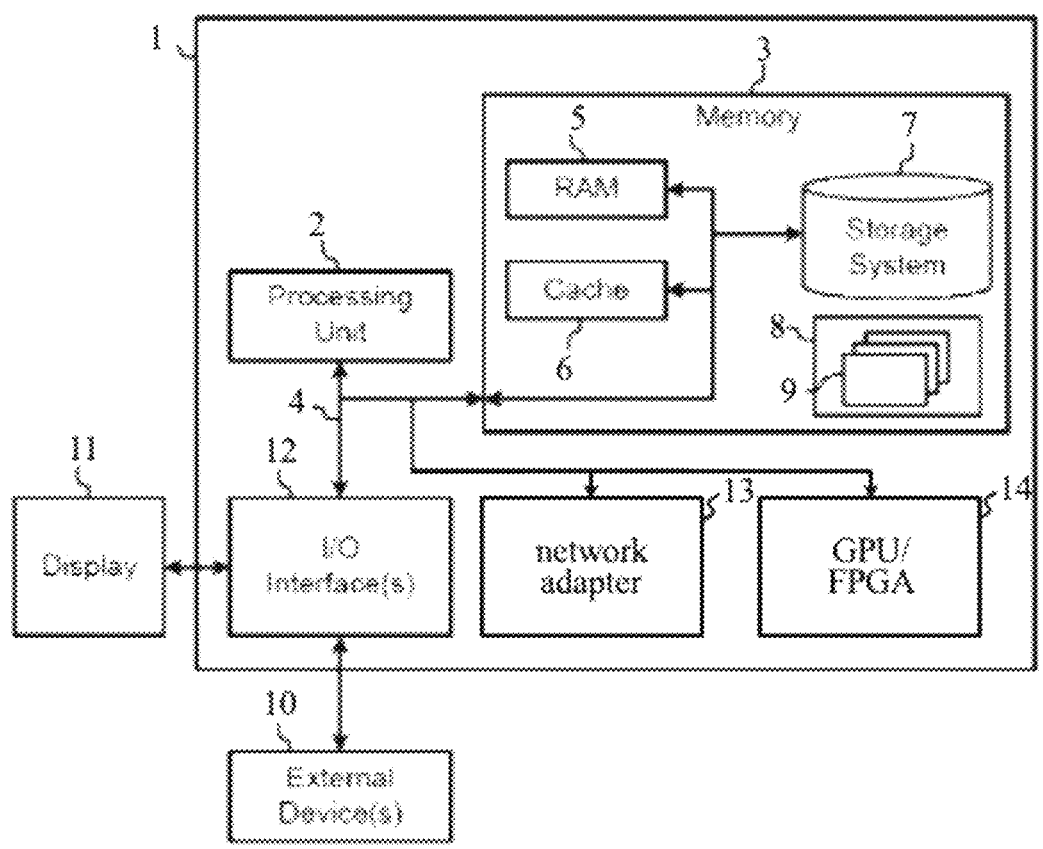
FIG. 1 is a schematic representation of a computing system for implementing methods embodying the present invention.

Some embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments to be described can be performed as computer-implemented methods for ranking text elements by specificity. Such methods may be implemented by a computing system comprising one or more general- or special-purpose computers, each of which may comprise one or more (real or virtual) machines, providing functionality for implementing operations described herein. Steps of methods embodying the present invention may be implemented by program instructions, e.g. program modules, implemented by a processing apparatus of the system. Generally, program modules may include routines, programs, objects, components, logic, data structures, and so on that perform particular tasks or implement particular abstract data types. The computing system may be implemented in a distributed computing environment, such as a cloud computing environment, where tasks are performed by remote processing devices that are linked through a communications network. In a distributed computing environment, program modules may be located in both local and remote computer system storage media including memory storage devices.

FIG. 1 is a block diagram of exemplary computing apparatus for implementing methods embodying the present invention. The computing apparatus is shown in the form of a general-purpose computer 1. The components of computer 1 may include processing apparatus such as one or more processors represented by processing unit 2, a system memory 3, and a bus 4 that couples various system components including system memory 3 to processing unit 2.

Bus 4 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 1 typically includes a variety of computer readable media. Such media may be any available media that is accessible by computer 1 including volatile and non-volatile media, and removable and non-removable media. For example, system memory 3 can include computer readable media in the form of volatile memory, such as random access memory (RAM) 5 and/or cache memory 6. Computer 1 may further include other removable/non-removable, volatile/non-volatile computer system storage media. By way of example only, storage system 7 can be provided for reading from and writing to a non-removable, non-volatile magnetic medium (commonly called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can also be provided. In such instances, each can be connected to bus 4 by one or more data media interfaces.

Memory 3 may include at least one program product having one or more program modules that are configured to carry out functions of embodiments of the present invention. By way of example, program/utility 8, having a set (at least one) of program modules 9, may be stored in memory 3, as well as an operating system, one or more application programs, other program modules, and program data. Each of the operating system, one or more application programs, other program modules, and program data, or some combination thereof, may include an implementation of a networking environment. Program modules 9 generally carry out the functions and/or methodologies of embodiments of the present invention as described herein.

Computer 1 may also communicate with: one or more external devices 10 such as a keyboard, a pointing device, a display 11, etc.; one or more devices that enable a user to interact with computer 1; and/or any devices (e.g., network card, modem, etc.) that enable computer 1 to communicate with one or more other computing devices. Such communication can occur via Input/Output (I/O) interfaces 12. Also, computer 1 can communicate with one or more networks such as a local area network (LAN), a general wide area network (WAN), and/or a public network (e.g., the Internet) via network adapter 13. As depicted, network adapter 13 communicates with the other components of computer 1 via bus 4. Computer 1 may also communicate with additional processing apparatus 14, such as a GPU (graphics processing unit) or FPGA, for implementing embodiments of the present invention. It should be understood that although not shown, other hardware and/or software components could be used in conjunction with computer 1. Examples include, but are not limited to: microcode, device drivers, redundant processing units, external disk drive arrays, RAID systems, tape drives, and data archival storage systems, etc.

Figure 2:
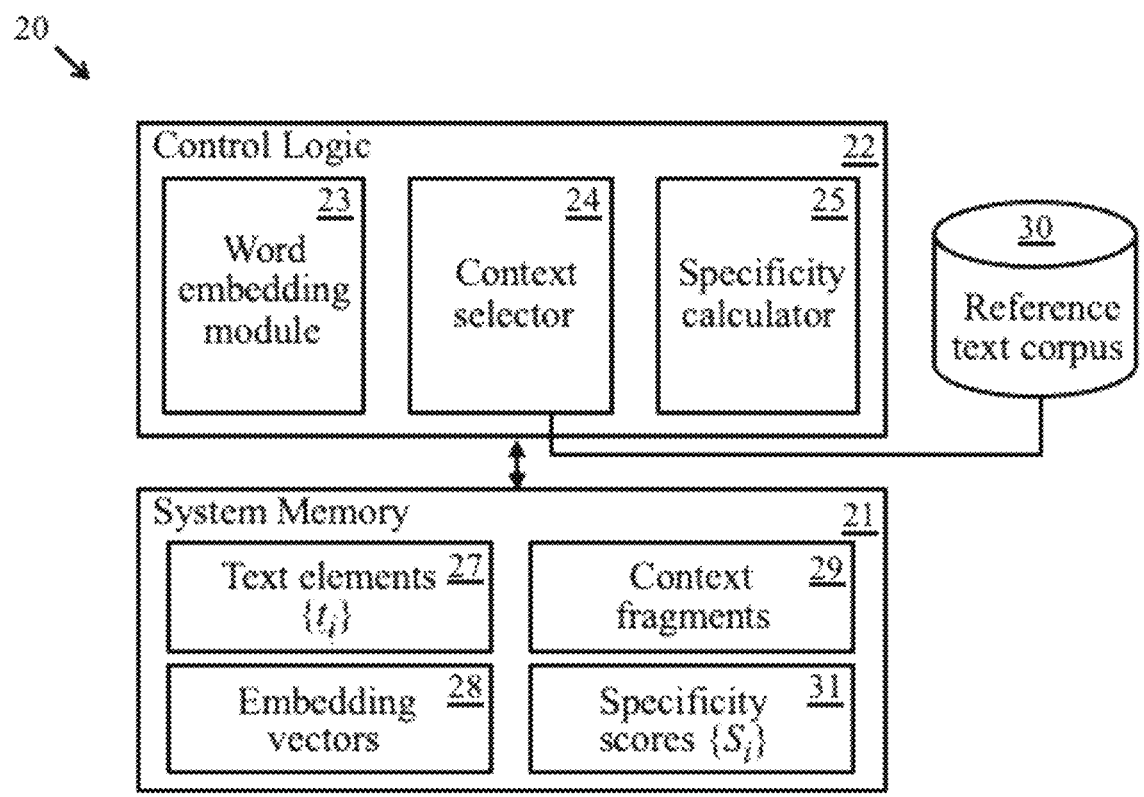
FIG. 2 illustrates component modules of a system embodying the present invention for ranking text elements by specificity.

The FIG. 2 schematic illustrates component modules of an exemplary computing system embodying the present invention. The system 20 includes memory 21 and control logic, indicated generally at 22, comprising functionality for ranking text elements by specificity. Control logic 22 comprises a word embedding module 23, a context selector module 24, and a specificity calculator module 25. Each of these modules comprises functionality for implementing particular steps of the ranking process detailed below. These modules interface with memory 21 which stores various data structures used in operation of system 20. These data structures include a set of N text elements 27 (denoted here by $\{t_i\}$, i=1 to N) to be ranked by specificity, a set of embedding vectors 28 which are generated by word embedding module 23, and a set of text fragments ("context fragments") 29 which are selected by context selector 24 from reference text, represented in the figure by text corpus 30. A set of specificity scores 31 (denoted here by $\{S_i\}$, i=1 to N) generated by specificity calculator 25 for the text elements $\{t_i\}$ is also stored in system memory 21.

In general, functionality of logic modules 23 through 25 may be implemented by software (such as program modules) or hardware or a combination thereof. Functionality described may be allocated differently between system modules in other embodiments, and functionality of one or more modules may be combined. The component modules of system 20 may be provided in one or more computers of a computing system. For example, all modules may be provided in a computer 1, or modules may be provided in one or more computers/servers to which user computers can connect via a network (which may comprise one or more component networks and/or internetworks, including the Internet) for input of text items to be ranked. System memory 21 may be implemented by one or memory/storage components associated with one or more computers of system 20.

The set of text elements $\{t_i\}$ may contain individual words and/or multiword expressions (MWEs), and may be compiled for a specific application/domain or span multiple domains for use in different applications. Some embodiments of the present invention incorporate MWEs in $\{t_i\}$ to exploit inherent specificity of these elements. A list of MWEs $t_i$ can be precompiled, either manually or automatically as described below, for storage in system memory 21.

Reference text corpus 30 may be local or remote from system 20 and may comprise text from one or more information sources spanning the domain(s) of the elements $\{t_i\}$ to be ranked. While represented as a single entity in FIG. 2, the reference text corpus may comprise content distributed over a plurality of information sources, e.g. databases and/or websites, which may be accessed dynamically by the system via a network. In some embodiments, reference text 28 may be precompiled for system operation and stored in system memory 21.

Figure 3:
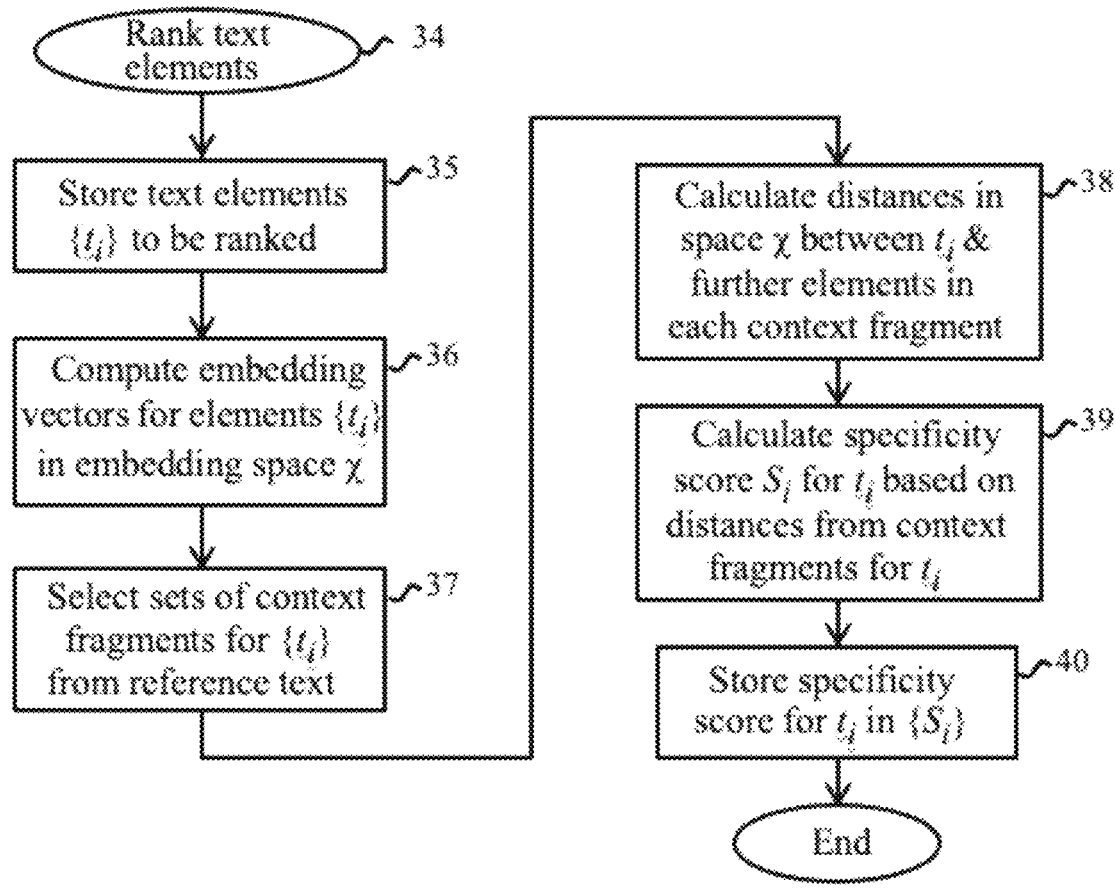
FIG. 3 indicates steps of a ranking method performed by the system illustrated in FIG. 2.

Flowchart 300 of FIG. 3 indicates steps of the ranking process performed by system 20 (designated as rank text elements step 34). Step 35 represents storage in system memory 21 of the set $\{t_i\}$ of text elements to be ranked. In step 36, word embedding module 23 computes an embedding vector for each text element $t_i$ via a word embedding scheme. Word embedding schemes are well-known, and essentially generate a mapping between text elements and vectors of real numbers which define locations of respective text elements in a multidimensional embedding space. The relative locations of text elements in this space are indicative of the degree of relationship between the text elements, with elements which are "closer" in the embedding space being more closely related than those which are further apart. In particular, the idea of word embeddings is to map elements appearing in similar text contexts to be close to each other in the embedding space. Any desired word embedding scheme may be employed here, including context-independent schemes using Word2Vec, GloVe (Global Vectors) or FastText models, for instance, or context-dependent schemes including models based on the transformer architecture, such as BERT (Bidirectional Encoder Representations from Transformers) models. A word embedding scheme can generate "clouds" of text elements which appear in similar contexts and therefore represent semantically similar concepts. Each of the embedding vectors generated by word embedding module 23 thus locates a corresponding text element $t_i$ in the embedding space, denoted here by $\chi$. The resulting vectors are stored at 28 in system memory 21.

In step 37, context selector module 24 selects a set of text fragments from reference text 30 for each element $t_i$ to be ranked. Each of these text fragments contains an element $t_i$ and further text elements (where these further text elements may or may not include one or more of the other elements $t_i$ to be ranked). For example, context selector 24 may select lines of text, sentences or paragraphs containing an element $t_i$ in the reference text, or a window of words around a given element $t_i$ in the text. In general, a set of one or more text fragments containing a given text element may be selected here, with some embodiments selecting a plurality of fragments for each element. The selected text fragments (possibly after further processing described below) are stored as context fragments 29 in system memory 21.

Steps 38 through 40 indicate operation of the specificity calculator 25. These steps are performed for each text element $t_i$ to be ranked. In step 38, the specificity calculator retrieves the context fragments containing a given element $t_i$ from the set of context fragments 29. For each fragment, specificity calculator 25 calculates respective distances in the embedding space $\chi$ between the element $t_i$ and the further text elements in that fragment. To calculate these distances, each further text element must first be located in embedding space $\chi$ by a corresponding embedding vector computed via the word embedding scheme. The embedding vectors for further text elements may be precomputed in step 36 above, e.g., via a context-independent embedding scheme as detailed below, or may be computed dynamically via a context-dependent embedding scheme. The distance in $\chi$ between $t_i$ and a further text element can be conveniently calculated as the cosine similarity between the two vectors representing these elements. However, any convenient distance metric, such as Euclidean distance, may be used in other embodiments. In step 39, the specificity calculator calculates the specificity score for the element $t_i$. The specificity score $S_i$ for element $t_i$ is dependent on the distances calculated in step 38 from the context fragments containing that element. The specificity score may be calculated from these distances in various ways as explained below. In step 40, the specificity score $S_i$ is stored in set 31 in system memory 21. After processing the context fragments for all text elements $\{t_i\}$, the resulting set of specificity scores $\{S_i\}$ then defines a ranking of these text elements by specificity.

The above method accommodates context for text elements in the calculation of specificity by using distances in embedding space $\chi$ between text elements in the context fragments. By injecting context into the information extracted from the word embedding, the resulting specificity scores provide a measure of homogeneity of the contexts in which text elements appear. This offers a true measure of specificity on the basis that highly-specific terms tend to appear in more homogeneous contexts than more general terms. As an illustrative example, the term "information hiding" is a highly technical expression used in software engineering when designing data structures which do not expose internal state to the outside. In contrast, "hiding information" is term which can be used, and will therefore appear, in many different contexts. The above technique thus offers improved specificity estimation, with consequent advantages for performance and resource-efficiency of information extraction applications. The technique is also fully unsupervised, allowing specificity scores to be computed for any set of text elements without requiring annotated training data.

Figure 4:
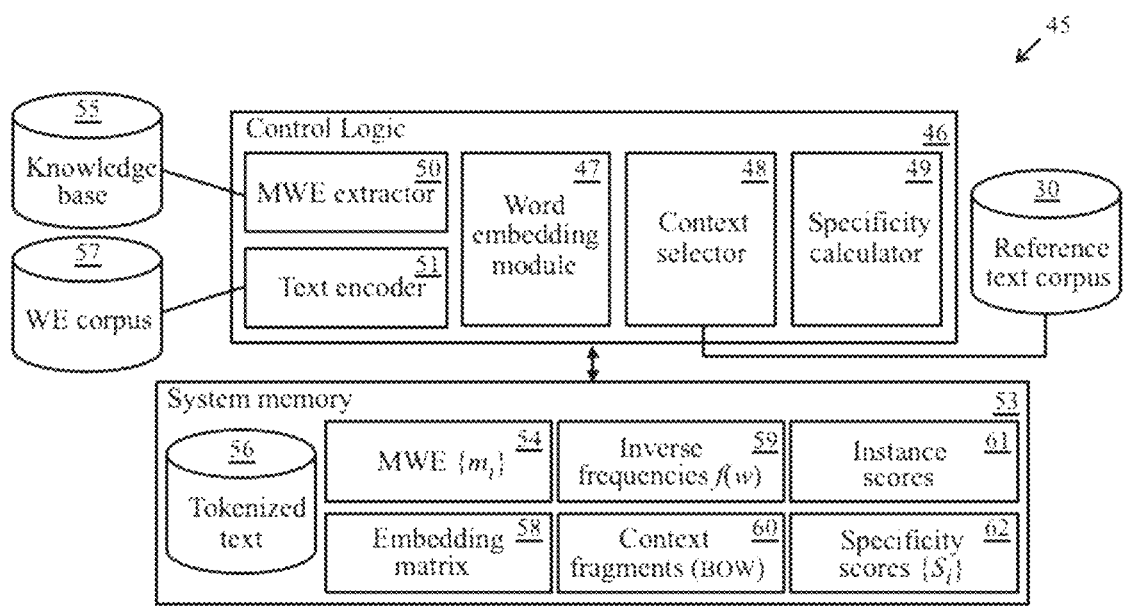
FIG. 4 illustrates component modules of a text element ranking system in an embodiment of the present invention.
Figure 5:
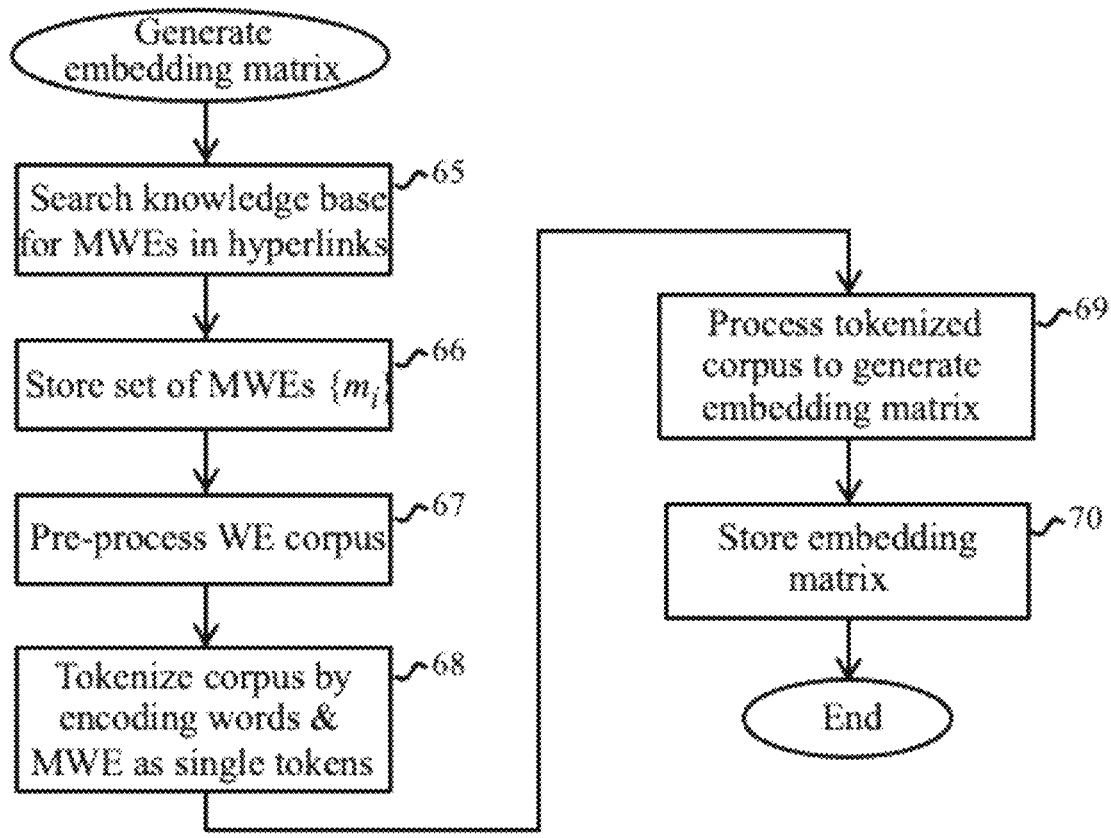
FIG. 5 indicates steps of a word embedding process in the system illustrated in FIG. 4.
Figure 6:
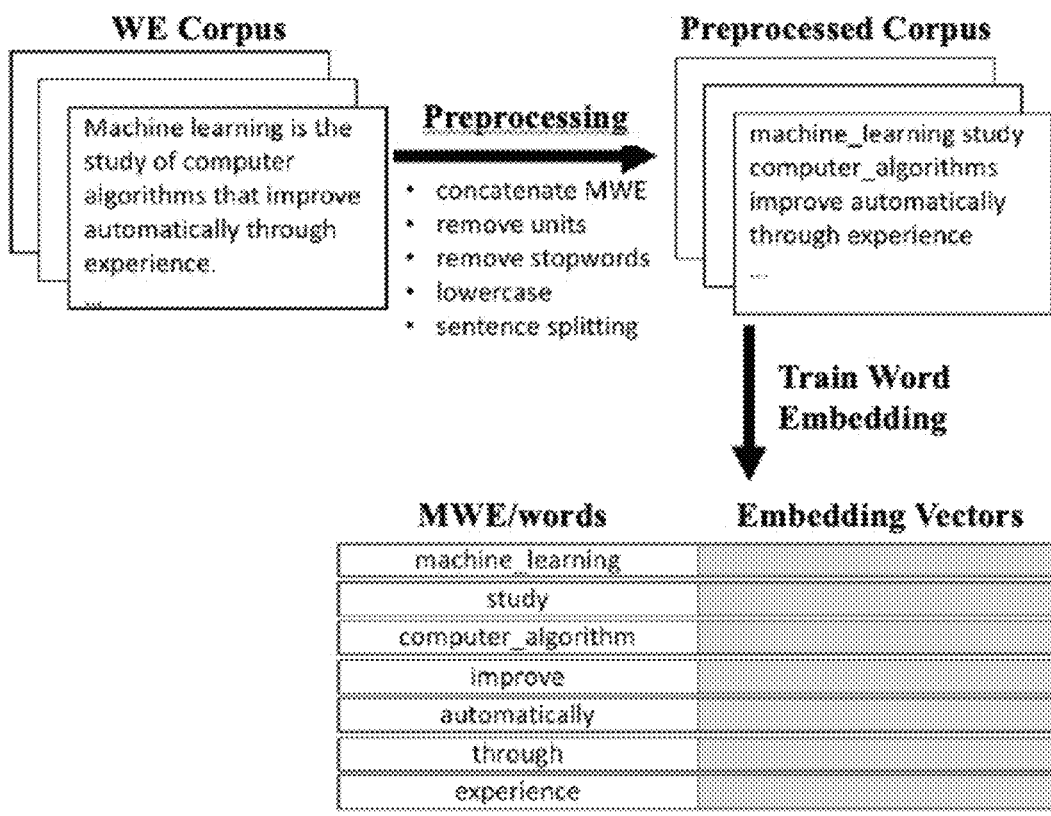
FIG. 6 is a schematic illustration of the word embedding process.

Diagram 400 of FIG. 4 shows a more detailed system implementation in some embodiments of the present invention. The system 45 of this embodiment is adapted to compile and rank a large set of MWEs, denoted by $\{m_i\}$. Control logic 46 of this system comprises a word embedding module 47, a context selector 48, and a specificity calculator 49 as before. The control logic also includes an MWE extractor module 50 and a text encoder module 51. The data structures stored in system memory 53 include the set 54 of MWEs $\{m_i\}$ which is compiled automatically by MWE extractor 50 from a knowledge base indicated schematically at 55, and a tokenized text dataset 56 which is generated by text encoder 51 from a text corpus indicated as WE (word embedding) corpus 57. In practice, knowledge base 55 and WE corpus 57 may represent content collated from, or distributed over, a plurality of information sources. Memory 53 also stores an embedding matrix 58 which is generated by word embedding module 47, and a set of inverse frequencies 59 which are described further below. In addition, memory 53 stores a set of context fragments 60 generated by context selector 48, and a set of instance scores 61, described further below, along with the final set of specificity scores 62 calculated for the MWEs $\{m_i\}$.

The operation of system 45 will be described with reference to FIGS. 5 through 8. Flowchart 500 of FIG. 5 indicates operational steps leading to generation of embedding matrix 58. In step 65, the MWE extractor 50 accesses knowledge base 55 to extract MWEs associated with hyperlinks in the knowledge base. A knowledge base (such as Wikipedia, DBPedia, Yago, etc.) is essentially a graph of concepts where the concepts are linked to each other. The MWE extractor 50 can extract MWEs from the knowledge base by searching through the hyperlinks. For example, in the following sentence (in which hyperlinks are signified by underlining): "In thermal power stations, mechanical power is produced by a heat engine which converts thermal energy, from combustion of a fuel, into rotational energy", the MWE extractor may select "heat engine" and "thermal energy". The hyperlinks in such knowledge bases are manually annotated, and therefore of high quality. By simply scanning the knowledge base text, MWE extractor 50 can extract a huge number of well-defined MWEs. In this example, the MWE extractor searches knowledge base 55 to compile a large dictionary of MWEs covering a wide range of topics. The resulting set $\{m_i\}$ of MWEs 54 is stored in memory 53 in step 66.

In steps 67 and 68, the text encoder 51 generates the tokenized text 56 by pre-processing and tokenizing WE corpus 57 such that each MWE $m_i$ is encoded as a single token, and other words in the corpus are encoded as respective tokens, in the tokenized text. In particular, in step 67, the text encoder preprocesses WE corpus 57 as indicated schematically in the data flow of diagram 600 of FIG. 6. Instances of MWEs $m_i$ are identified in the raw corpus, and each of these is concatenated and treated as an individual word. For example, an MWE "machine_learning" is concatenated as "machine_learning". All units and stop words (such as "a", "and", "was", etc.,) are also removed during preprocessing, and all capital letters are changed to lowercase. The resulting text is then split into sentences for training the word embedding. In step 68 of FIG. 5, the preprocessed text is tokenized by encoding all remaining words and MWE as respective single tokens. One-hot encoding is conveniently employed here, though other encoding schemes can of course be envisaged. Each token thus represents a particular word/MWE, and that word/MWE is replaced by the corresponding token wherever it appears in the preprocessed text. The resulting tokenized text 56 is stored in system memory 53.

In step 69, word embedding module 47 processes tokenized text 56 to generate the embedding matrix 58. In this embodiment, the tokenized sentences in text 56 are used to train a Word2Vec embedding model using known CBOW (Common Bag Of Words) and negative sampling techniques (see, for example, "Distributed representations of words and phrases and their compositionality," Mikolov et al., Advances in Neural Information Processing Systems 26, 2013, pp. 3111-3119). This results in a set of embedding vectors, one for each of the tokens corresponding to respective MWE/words in the preprocessed text, as illustrated schematically in FIG. 6. This set of vectors constitutes the embedding matrix 58 which is stored in system memory 53 in step 70. The resulting embedding matrix thus comprises embedding vectors corresponding to the text elements (here MWE) to be ranked as well as the further text elements which will be contained in the text fragments selected from reference text corpus 30 by context selector 48. (In this regard, while a distinct reference text corpus 30 is shown in FIG. 4, in other embodiments WE corpus 57 may serve as the reference text for context fragments, whereby embedding vectors will be available for all text elements in the context fragments.)

When processing WE corpus 57, embedding module 47 counts the number of instances of each text element (MWE or word, denoted generally here by w) in the pre-processed corpus. For each element w, the embedding module computes an inverse frequency of occurrence f(w) of that element. The inverse frequency of occurrence of an element w appearing n times in a corpus of m words is defined as f(w)=m/n. The set of inverse frequencies f(w) for elements w is stored at 59 in system memory 53.

Figure 7:
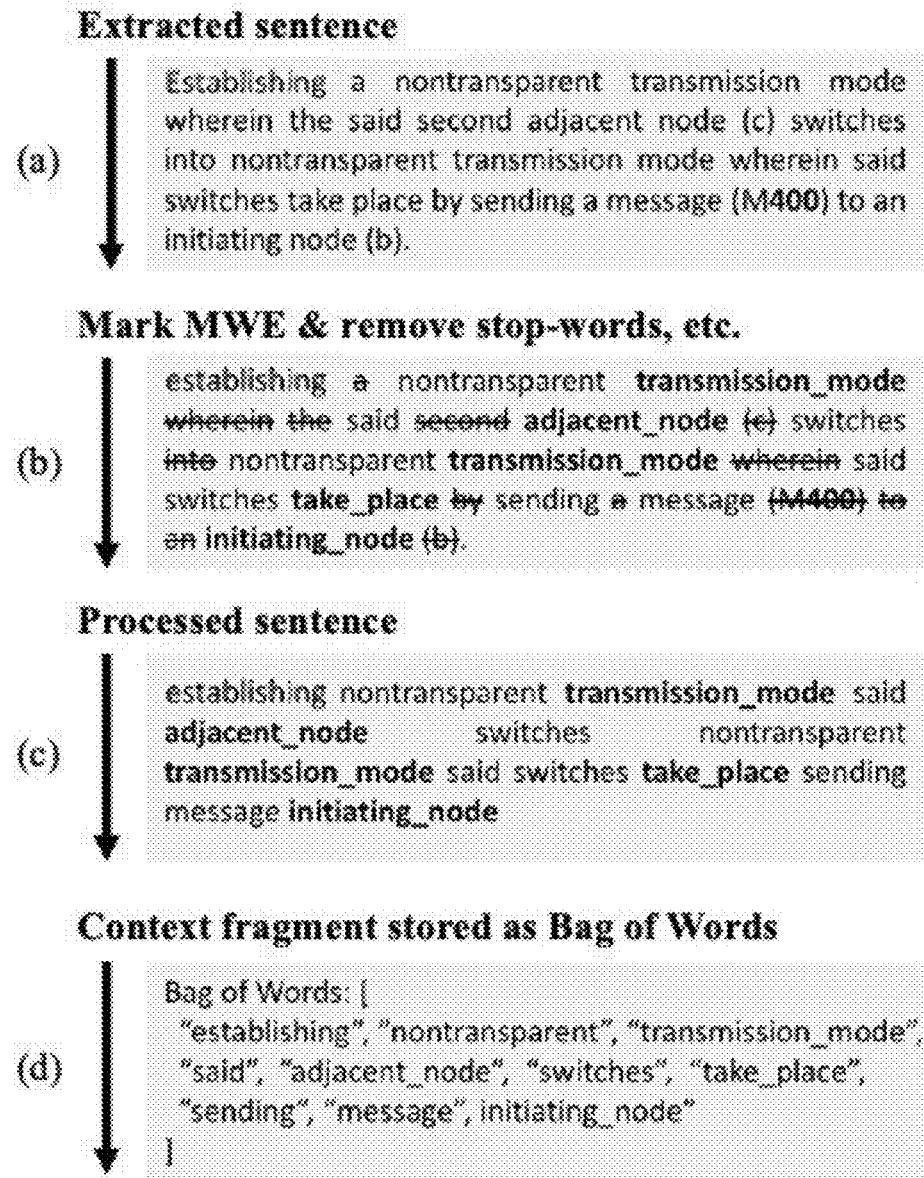
FIG. 7 illustrates operation of a context fragment selector in the system shown in FIG. 4.

The operation of context selector 48 here is indicated in the data flow of diagram 700 of FIG. 7. In this example, context selector 48 uses a reference text corpus 30 which is distinct from WE corpus 57. In step (a) of FIG. 7, the context selector extracts sentences from the reference corpus 30. In step (b), all instances of MWE $m_i$ in the sentences are identified and marked, as indicated by bold type and concatenation in the figure. All common stop-words, units and numbers are also identified, as indicated by strike-throughs in step (b), and these are removed in step (c) to obtain processed sentences. Each processed sentence which contains an instance of an MWE $m_i$ is selected as a context fragment. The context selector then stores each context fragment in set 60, here as a "Bag of Words" (BOW) as illustrated at step (d).

Figure 8:
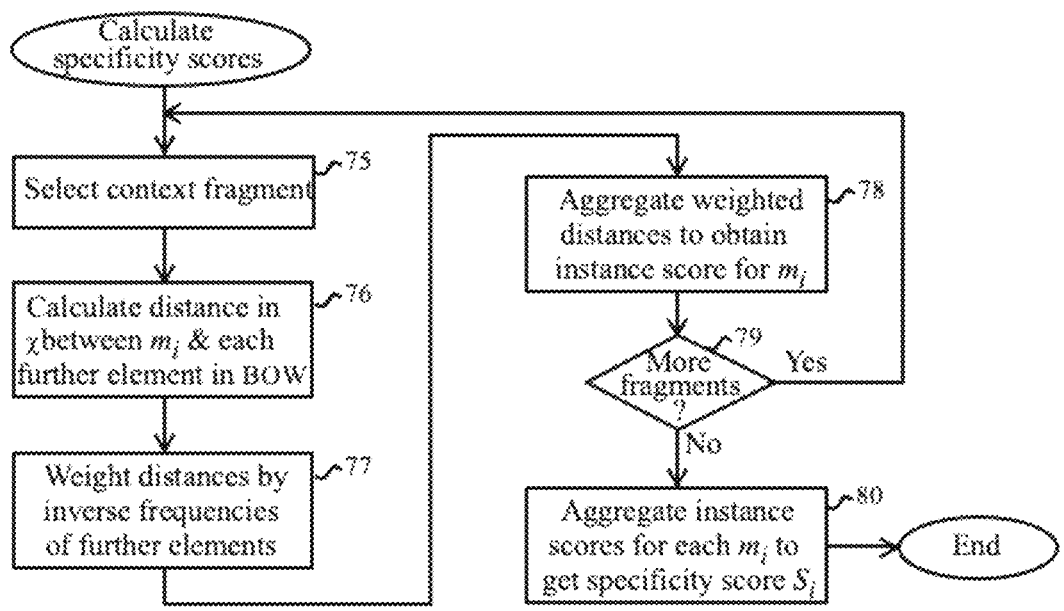
FIG. 8 indicates steps of a specificity score calculation process in the system shown in FIG. 4.

Flowchart 800 of FIG. 8 illustrates operation of the specificity calculator 49 in this embodiment. In step 75, the specificity calculator selects a context fragment from fragment set 60. Subsequent steps 76 through 78 are then performed for each MWE $m_i$ in the BOW for the selected fragment. In step 76, the specificity calculator computes the distance, in embedding space x, between the MWE $m_i$ and each further text element (MWE/word) w in the BOW for which an embedding vector is contained in embedding matrix 58. Distance, denoted here by d($m_i$, w) is calculated as the cosine similarity between the two vectors representing $m_i$ and w respectively. This yields a number in the range (−1, +1), with higher numbers signifying elements $m_i$ and w which are closer in embedding space $\chi$.

The specificity calculator then calculates an instance score 61 for the MWE $m_i$ from the distances calculated in step 76 for the current fragment. In this embodiment, each distance d($m_i$, w) is first weighted based on the inverse frequency of occurrence f(w) stored in set 59 for element w, and the instance score for the MWE $m_i$ is calculated as a function of the weighted distances for the fragment. In particular, in step 78, the specificity calculator obtains the instance score by aggregating the weighted distances for that fragment. In this example, given a BOW containing an MWE $m_i$ and further elements $w_1, \ldots, wk_i$ an instance score $T_i$ is computed as:

$$T_i = \frac{\sum_{j=1}^{k} f(w_j) \cdot d(m_i, w_j)}{\sum_{j=1}^{k} \sum f(w_j)}.$$

If there are more context fragments to be processed at decision step 79, then operation reverts to step 75 where the next fragment is selected from set 60 and processed as above. When all context fragments have been processed at step 79, operation proceeds to step 80. Here, for each MWE $m_i$, specificity calculator 49 calculates a specificity score $S_i$ as a function of the instance scores $T_i$ for $m_i$. In this embodiment, the specificity score $S_i$ is computed by aggregating the instance scores $T_i$ here as a simple average: $S_i = \Sigma T_i$. The final specificity score $S_i$ for an MWE is thus a corpus-level score which aggregates the instance scores $T_i$ for the MWE over the entire reference corpus. The resulting set 62 of specificity scores $\{S_i\}$ rank all MWEs $m_i$ in WE corpus 57 by specificity.

Weighting the distances by inverse frequencies above penalizes the contributions of common (and likely more general) elements w, biasing the average towards less common (and likely more specific) elements. By producing embedding matrix 58 from a large and diverse WE corpus 57, with a large dictionary of MWE, the above system can automatically produce specificity scores for use in a wide range of applications. In general, however, specificity scores $\{S_i\}$ may be calculated for any subset of the tokens, for MWE and/or individual words, in the embedding space $\chi$, and this subset may be specific to a given field or application. The embedding matrix 58 may also be generated for MWE/words relevant to a specific technical field/application in other embodiments.

The tables of FIGS. 9a (900a) and 9b (900b) show extracts from specificity rankings generated by an implementation of the FIG. 4 system. The results in FIG. 9A were obtained using a reference text corpus comprising 1.5 million patent abstracts. The results in FIG. 9B were obtained using a reference text corpus comprising 1.2 million abstracts from arXiv papers. Both sets of results used an embedding matrix built from a WE corpus of more than 100 million news articles. FIG. 9A shows the specificity scores for the 10 highest- and lowest-scoring MWEs with tokens containing the word "knowledge". FIG. 9b shows the 10 highest- and lowest-scoring MWEs with tokens containing the word "language". It can be that the scores correlate well with specificity of the MWEs listed. These examples demonstrate that specificity scores computed by the above technique, even as a simple average of instance scores computed over a large reference corpus, can reliably distinguish highly technical MWE from more common expressions.

The specificity ranking technique can be used to enhance operation of numerous data processing applications in which, after ranking text elements by specificity, the specificity scores are used in processing a text data structure to extract data having a desired specificity. Use of the specificity scores can reduce the processing resources required to extract relevant data from various data structures for various purposes, and can improve quality of extracted data, thus enhancing performance of applications using these data structures. Some illustrative applications are described below with reference to FIGS. 10 through 14.

Figure 10:
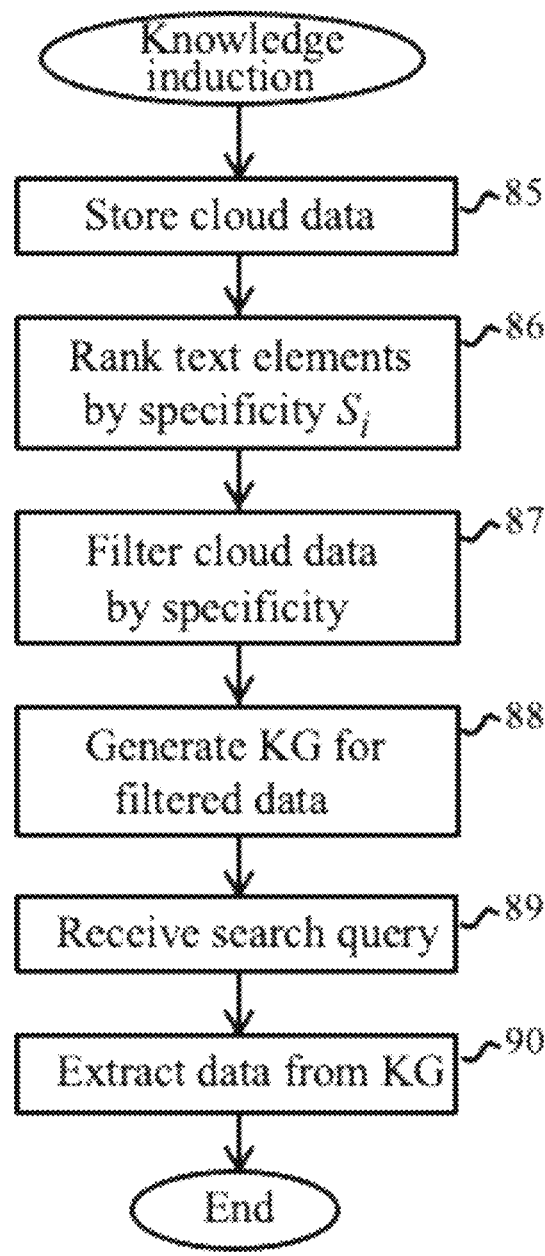
FIGS. 10 through 13 indicate operational steps of applications using text element ranking methods embodying the present invention.

Flowchart 1000 of FIG. 10 illustrates operation of a knowledge induction system for extracting knowledge from a large text corpus. Such applications commonly process huge volumes of text mined from databases/websites in the cloud. Step 85 represents storage of the cloud data to be analyzed. In step 86, the ranking method described above is employed to rank text elements in this data by specificity. In step 87, the cloud data is filtered, based on the specificity scores, to identify a set of the most-specific text elements in the corpus, e.g., text elements with specificity scores greater than a defined threshold. In step 88, a knowledge graph (KG) is then constructed from the filtered data. Knowledge graphs are well-known data structures which are commonly used to extract meaningful knowledge from large volumes of data for industrial, commercial or scientific applications. A knowledge graph essentially comprises nodes, representing entities, interconnected by edges representing relations between the connected entities. The knowledge graph constructed in step 88 thus comprises nodes corresponding to elements in the identified set of most-specific text elements, interconnected by edges representing relations between those nodes. (Such relations can be defined in various ways for particular applications as will be apparent to those skilled in the art). The resulting knowledge graph provides a data structure which can be searched to extract information represented in the graph. In response to an input search query in step 89, the system then searches the graph in step 90 to extract requested data from the data structure. Filtering the data used to construct the knowledge graph in this application can significantly reduce the size of the data structure, and hence memory required for storing the graph, while ensuring that the most specific data, which contains most information, is retained. The compute intensity of search operations is likewise reduced, and search results are focused on more specific, typically more useful, information.

Figure 11:
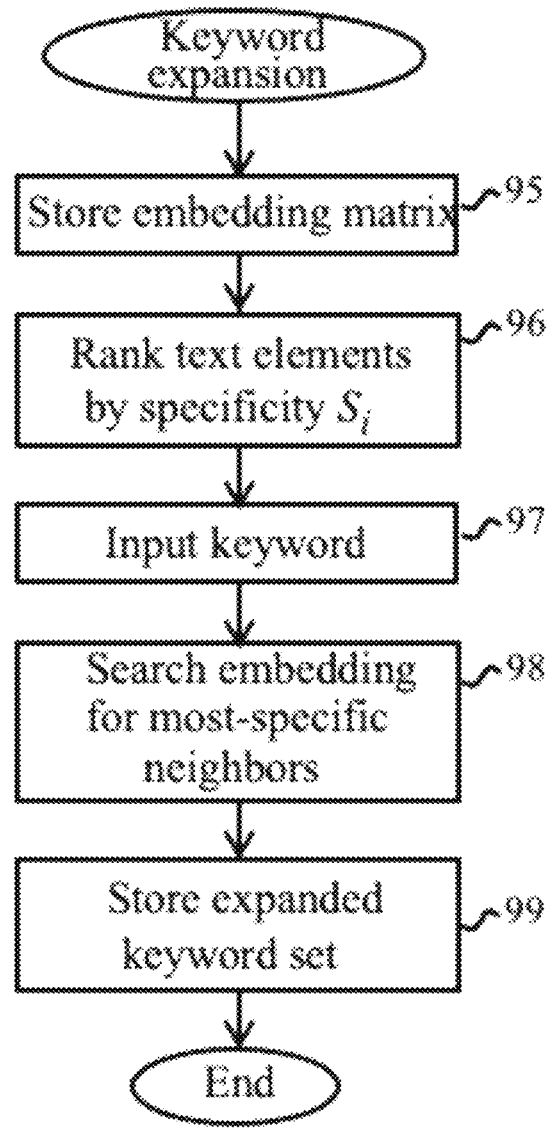

Another application of the specificity scores relates to expansion of keyword sets for search processes. Flowchart 1100 of FIG. 11 illustrates operation of such a system. Step 95 represents storage in the system of a word embedding matrix comprising vectors locating respective text elements in a latent embedding space. Such a matrix can be generated in similar manner to embedding matrix 58 of FIG. 4, and may encode a wide range of words/MWE in one or more technical fields. In step 96, the text elements in the embedding matrix are ranked by specificity as described above. Step 97 represents input by a user of a keyword, represented by a vector in the embedding matrix, relating to a field to be searched. In step 98, the system then searches the embedding space around that keyword to identify neighboring text elements in the embedding space. Various clustering/nearest-neighbor search processes can be employed here, with the search process being adapted to locate a set of the most-specific text elements (e.g., elements with specificity scores above a desired threshold) neighboring the input keyword. In step 99, the text elements thus identified are stored, along with the user input keyword, as an expanded keyword set. This expanded keyword set can then be used to search a text corpus, e.g., by string matching keywords in the set to documents in the corpus, to identify relevant documents in the required field. Use of the specificity scores in this application allows small, user-input keyword sets to be automatically expanded with highly-specific related keywords, facilitating location of relevant documents in a given field. A particular example of this application is for collating training documents for training text classifier models.

Figure 12:
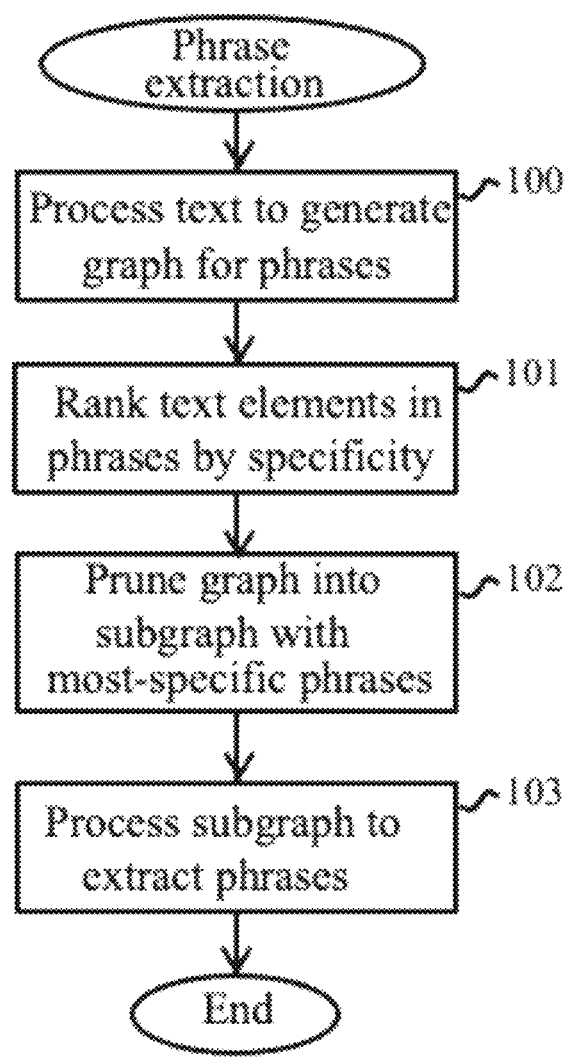

Flowchart 1200 FIG. 12 illustrates use of the specificity scores in an automated phrase extraction system. Phrase extraction systems are well-known, and can be used to extract theme phrases or key phrases from documents for abstraction/summarization purposes (see, for example, "Key2Vec: Automatic ranked keyphrase extraction from scientific articles using phrase embeddings," Mahata et al., Proceedings of the 2018 Conference of the North American Chapter of the Association for Computational Linguistics: Human Language Technologies, Volume 2, June 2018, pp. 634-639). These systems often use graph-based representations for candidate key phrases in documents. Nodes representing candidate phrases are interconnected by edges, representing relations between nodes, with associated weights (dependent on semantic similarity, frequency of occurrence, etc.,) which are then used to select the best candidates. Step 100 of FIG. 12 represents the usual text processing operation to generate a graph for candidate phrases. In step 101, text elements in the graph are ranked by specificity using a method described above. In step 102, the graph is pruned in dependence on specificity scores for text elements in the candidate phrases to obtain a subgraph representing a most-specific subset of these phrases. This most-specific subset may comprise phrases containing text elements with specificity scores above a desired threshold. In step 103, the resulting subgraph is then processed in the usual way to extract the best candidate phrases from this subgraph. Such processing may involve scoring nodes based on various graph features to extract the best phrases for the desired purpose.

Figure 13:
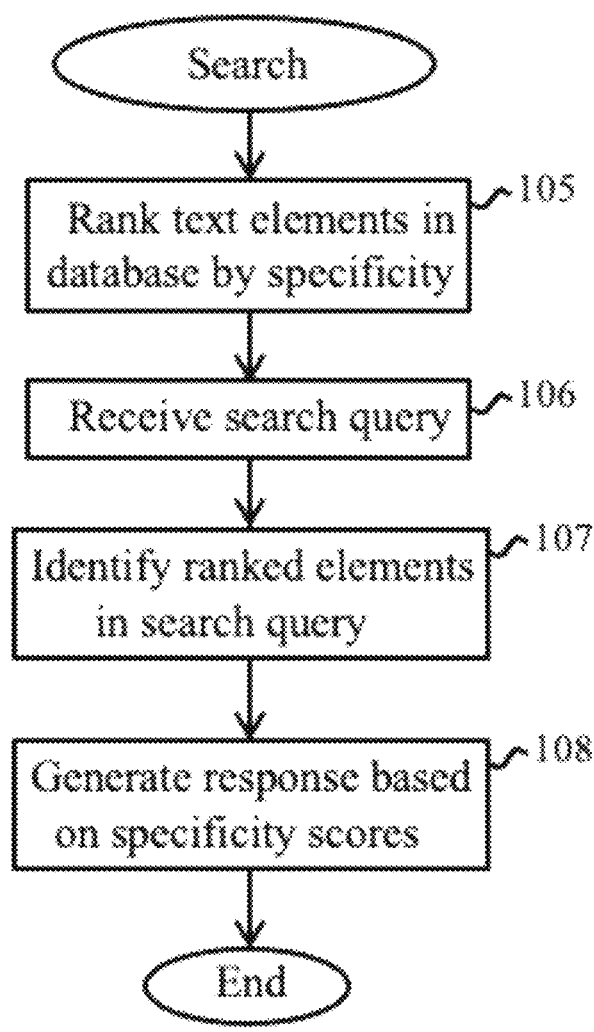

Flowchart 1300 of FIG. 13 illustrates use of specificity scores in a search system. In step 105 here, text elements in a search database are ranked by specificity as described above. In response to input of a search query in step 106, the system identifies any ranked text elements in the query text. In step 108, the system generates a response to the search query by extracting data from the search database in dependence on the specificity scores for any ranked text elements so identified. The response here may be to suggest alternative search queries to the user, or to retrieve requested data from the search database. The specificity scores can be used here to identify the most relevant alternative queries or response data based on elements with the highest specificity scores in the input query. The specificity scores may also be used to assess the degree of knowledge of the user and return results accordingly. For example, input queries containing highly-specific text elements suggest a knowledgeable user wanting more detailed results, whereas low-specificity queries suggest a user needing more general, high-level results.

It will be seen that the specificity ranking technique offers more efficient processing and improved results in various processing applications, and can reduce the memory and processing resources required for knowledge extraction operations.

Methods embodying the present invention are predicated on the realization that highly-specific text elements, such as those representing technical concepts, tend to appear in textual contexts which are homogeneous in nature. These methods use fragments of the reference text to provide contexts for the text elements to be ranked. The specificity score for a given text element is then based on distance in the embedding space between that text element and other text elements in the selected text fragments containing that element. Methods embodying the present invention build upon the aforementioned realization, accommodating context for text elements in the information extracted from the word embedding such that the resulting specificity scores provide a measure of homogeneity of the contexts in which text elements appear. This provides an elegantly simple technique for capturing specificity of text elements, offering improved estimation of specificity and enhanced performance of processing systems using such estimates.

After ranking the plurality of text elements, methods embodying the present invention may process a text data structure using the specificity scores for text elements to extract data having a desired specificity from the data structure. Using the specificity scores can reduce the processing resources needed to extract relevant data from data structures in various applications, and can improve the quality of extracted data, thus enhancing performance. For example, the specificity scores can be used as a filtering mechanism to reduce the memory required to store search structures such as knowledge graphs, e.g., by pruning graphs to remove unnecessary elements, so reducing compute-intensity of search operations performed on such graphs. Examples of other text data structures, and processing applications employing these structures, will be described in more detail below.

In general, the text elements to be ranked may comprise single-word text elements (i.e., individual words) and/or multiword expressions (i.e., text elements comprising at least two words). Multiword expressions include word combinations, such as open compound words or phrases, which collectively convey a particular meaning or act as a semantic unit at some level of linguistic analysis. In some embodiments, the plurality of text elements to be ranked comprise multiword expressions, exploiting the fact that these are often inherently more specific than single words. A single embedding vector is then computed for each multiword expression, i.e. the multiword expression is treated as if it were a single word for the embedding process. The text elements to be ranked may of course include individual words as well as multiword expressions if desired.

Some embodiments of the present invention select a plurality of text fragments containing each text element to be ranked from the reference text. For each text fragment (e.g., a sentence) containing an element to be ranked, these embodiments calculate an instance score which is dependent on the distances between that text element and the further text elements in that fragment. The specificity score for the text element is then calculated as a function of the instance scores for the plurality of text fragments containing that element. Accuracy of the specificity scores generally improves with increasing numbers of text fragments selected as contexts for the text elements. In some embodiments of the present invention, the reference text comprises a text corpus and, for each text element to be ranked, a fragment of the text corpus is selected for each instance of that text element in the corpus.

In calculating an instance score from a text fragment, some embodiments weight the distance between the text element to be ranked and each further text element by an inverse frequency of occurrence (explained below) of that further text element in a text corpus, e.g., a corpus used for computing embedding vectors. The instance score is calculated as a function of these weighted distances for the fragment. This weighting serves to penalize the contributions of more common words, giving more weight to infrequent words, thus enhancing accuracy of the specificity scores.

The embedding vectors may be computed by any convenient word embedding scheme which may include a context-independent or a context-dependent embedding scheme. Context-independent word embedding schemes process a text corpus to produce an embedding matrix containing the embedding vectors for selected text elements (here words and/or multiword expressions) in the text. Context-dependent schemes employ embedding models which can take any input text and output an embedding vector for that text. Embodiments using context-independent embeddings have been found to offer enhanced precision, especially for more technical terms, in the specificity calculation. Certain methods therefore process a text corpus to generate an embedding matrix. In particular, some embodiments tokenize the text corpus such that each of the text elements to be ranked is encoded as a single token, and other words in the corpus are encoded as respective tokens, in the tokenized text. The tokenized text is then processed via the word embedding scheme to generate an embedding matrix comprising the embedding vectors corresponding to the text elements to be ranked and the further text elements to be extracted from text fragments selected for context purposes. A set of multiword expressions to be encoded as single tokens can be stored prior to tokenizing the corpus. Some embodiments of the present invention can compile the set of multiword expressions automatically by processing a text dataset, e.g., by auto-extraction of expressions from a large document set or by identifying hyperlinks containing multiword expressions in text from online knowledge bases. In this way, a large dictionary of multiword expressions can be compiled for the embedding process. All or a subset of these can then be ranked by specificity as required.

It will of course be appreciated that numerous changes and modifications can be made to the exemplary embodiments described. For example, dictionaries of MWEs to be ranked may be extracted by automated phrase extraction systems in other embodiments. Instance scores can be calculated in various ways by averaging, summing or otherwise aggregating the distances or weighted distances, and specificity scores may be calculated as other functions of the instance scores or underlying distances. By way of example, specificity scores may be based on statistical processing of a distribution of instance scores for an element, e.g. as a statistical mean after removing highest and lowest instance scores from the distribution.

Steps of flow diagrams may be implemented in a different order to that shown and some steps may be performed in parallel where appropriate. In general, where features are described herein with reference to a method embodying the present invention, corresponding features may be provided in a computing system/computer program product embodying the present invention, and vice versa.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for ranking a plurality of text elements comprising:
   training an embedding model included in a word embedding scheme, using a tokenized text database;
   computing, via the word embedding scheme, an embedding vector which locates a first text element of a plurality of text elements to be ranked in an embedding space;
   selecting a set of text fragments from a reference text, with each text fragment containing the first text element and at least one other text element to be ranked;
   for each text fragment, calculating respective distances in the embedding space between the at least one other text element to be ranked and the first text element to be ranked, wherein each other text element is located in the space by an embedding vector computed via the word embedding scheme;
   calculating a specificity score for the first text element to be ranked, wherein the specificity score is dependent on the respective distances in the embedding space;
   storing the specificity score, with specificity scores for the plurality of text elements defining a ranking of the text elements by specificity;
   filtering the text elements to identify most-specific text elements that have the specificity scores greater than a predetermined threshold; and
   using the most-specific text elements to construct a knowledge graph, wherein the knowledge graph includes nodes corresponding to the most-specific text elements and the nodes are interconnected by edges representing relations between the most-specific text elements.

2. The method of claim 1, wherein the plurality of text elements to be ranked includes multiword expressions.

3. The method of claim 1, wherein the plurality of text elements to be ranked include single-word text elements.

4. The method of claim 1, further including processing a text corpus by:
   tokenizing the text corpus such that each of the text elements to be ranked is encoded as a single token and other words in the text corpus are encoded as respective tokens; and
   processing the tokenized text via the word embedding scheme to generate an embedding matrix including the embedding vectors corresponding to the text elements to be ranked and the at least one other text element to be ranked.

5. The method of claim 4, further including:
   storing a set of multiword expressions prior to tokenizing the corpus; and
   while tokenizing the corpus, encoding each multiword expression in the set of multiword expressions as a single token.

6. The method of claim 5, further including compiling the set of multiword expressions by processing a text dataset.

7. The method of claim 1, further including:
   for each text element to be ranked:
      selecting a plurality of text fragments containing the first text element from the reference text;
      for each text fragment, calculating an instance score dependent on the distances between the first text element to be ranked and the at least one other text elements in the fragment; and
      calculating the specificity score as a function of the instance scores for the plurality of text fragments.

8. The method of claim 7, further including:
   for each text fragment:
      weighting the distance between the first text element to be ranked and each of the at least one other text element by the inverse of the frequency of occurrence of the further text element in a text corpus; and
      calculating the instance score as a function of the weighted distances for the text fragment.

9. The method of claim 1, further including:
   for each text element to be ranked:
      calculating the instance score for each of the plurality of text fragments by aggregating the weighted distances for the fragment; and
      calculating the specificity score by aggregating the instance scores for the plurality of text fragments.

10. The method of claim 7, wherein the reference text includes a text corpus; and
   for each text element to be ranked, a fragment of the text corpus is selected for each instance of the first text element in the text corpus.

11. The method of claim 1, wherein each text fragment includes a sentence.

12. The method of claim 1, including, after ranking said plurality of text elements, processing a text data structure using the specificity scores for text elements to extract data having a desired specificity from the data structure.

13. The method of claim 12, wherein the text data structure includes a corpus of text, and with the method further including:
   using the specificity scores for text elements in the corpus to construct the knowledge graph including a set of the most-specific text elements in the corpus; and
   in response to input of a search query, searching the knowledge graph to extract data relating to the search query.

14. The method of claim 12, wherein the text data structure includes a word embedding matrix including vectors locating respective text elements in a latent space, and with the method further including:
   in response to input of a text element corresponding to a vector in the latent space, identifying, based on the specificity scores, a set of the most-specific text elements neighboring the input text element in the latent space.

15. The method of claim 12, wherein the text data structure includes a graph having nodes representing text phrases, with the graph being interconnected by edges representing relations between nodes, and with the method further including:
   pruning the graph in dependence on specificity scores for text elements in the text phrases to obtain a subgraph representing a most-specific subset of the phrases; and
   processing the subgraph to extract desired phrases.

16. The method of claim 12, wherein the text data structure includes a search database, and with the method including:
   in response to input of a search query:
      identifying any ranked text elements in the search query; and
      generating a response to the search query by extracting data from the search database in dependence on the specificity scores for any ranked text elements so identified.

17. A computer program product for ranking a plurality of text elements comprising:

a machine readable storage device; and computer code stored on the machine readable storage device, with the computer code including instructions and data for causing a processor(s) set to perform operations including the following:

training an embedding model included in a word embedding scheme, using a tokenized text database;

computing, via the word embedding scheme, an embedding vector which locates a first text element of a plurality of text elements to be ranked in an embedding space;

selecting a set of text fragments from a reference text, with each text fragment containing the first text element and at least one other text element to be ranked;

for each text fragment, calculating respective distances in the embedding space between the at least one other text element to be ranked and the first text element to be ranked, wherein each other text element is located in the space by an embedding vector computed via the word embedding scheme;

calculating a specificity score for the first text element to be ranked, wherein the specificity score is dependent on the respective distances in the embedding space;

storing the specificity score, with specificity scores for the plurality of text elements defining a ranking of the text elements by specificity;

filtering the text elements to identify most-specific text elements that have the specificity scores greater than a predetermined threshold; and using the most-specific text elements to construct a knowledge graph, wherein the knowledge graph includes nodes corresponding to the most-specific text elements and the nodes are interconnected by edges representing relations between the most-specific text elements.

18. The computer program product of claim 17, further including:

after ranking the plurality of text elements, processing a text data structure using the specificity scores for text elements to extract data having a desired specificity from the data structure.

19. A computing system for ranking a plurality of text elements comprising:

a processor(s) set;

a machine readable storage device; and computer code stored on the machine readable storage device, with the computer code including instructions and data for causing the processor(s) set to perform operations including the following:

training an embedding model included in a word embedding scheme, using a tokenized text database;

computing, via the word embedding scheme, an embedding vector which locates a first text element of a plurality of text elements to be ranked in an embedding space;

selecting a set of text fragments from a reference text, with each text fragment containing the first text element and at least one other text element to be ranked;

for each text fragment, calculating respective distances in the embedding space between the at least one other text element to be ranked and the first text element to be ranked, wherein each other text element is located in the space by an embedding vector computed via the word embedding scheme;

calculating a specificity score for the first text element to be ranked, wherein the specificity score is dependent on the respective distances in the embedding space;

storing the specificity score, with specificity scores for the plurality of text elements defining a ranking of the text elements by specificity;

filtering the text elements to identify most-specific text elements that have the specificity scores greater than a predetermined threshold; and using the most-specific text elements to construct a knowledge graph, wherein the knowledge graph includes nodes corresponding to the most-specific text elements and the nodes are interconnected by edges representing relations between the most-specific text elements.

20. The computing system of claim 19, further including:

after ranking the plurality of text elements, processing a text data structure using the specificity scores for text elements to extract data having a desired specificity from the data structure.

\* \* \* \* \*